United States Patent
Goldhammer

(10) Patent No.: US 8,824,413 B2
(45) Date of Patent: Sep. 2, 2014

(54) DIRECT COMMUNICATIONS IN WIRELESS NETWORKS

(75) Inventor: Mariana Goldhammer, Ramat Gan (IL)

(73) Assignee: Sparkmotion Inc., Ottawa (CA)

( * ) Notice: Subject to any disclaimer, the term of this patent is extended or adjusted under 35 U.S.C. 154(b) by 306 days.

(21) Appl. No.: 13/284,399

(22) Filed: Oct. 28, 2011

(65) Prior Publication Data

US 2012/0106502 A1 May 3, 2012

(30) Foreign Application Priority Data

Oct. 31, 2010 (IL) .......................................... 209009

(51) Int. Cl.
*H04W 4/00* (2009.01)
*H04W 72/12* (2009.01)
*H04W 76/00* (2009.01)
*H04W 92/18* (2009.01)
*H04W 72/04* (2009.01)
*H04W 4/08* (2009.01)
*H04W 76/02* (2009.01)

(52) U.S. Cl.
CPC .......... *H04W 72/121* (2013.01); *H04W 76/002* (2013.01); *H04W 92/18* (2013.01); *H04W 72/0453* (2013.01); *H04W 4/08* (2013.01); *H04W 72/0446* (2013.01); *H04W 76/02* (2013.01)
USPC ........... 370/330; 370/261; 370/331; 370/335; 370/346

(58) Field of Classification Search
None
See application file for complete search history.

(56) References Cited

U.S. PATENT DOCUMENTS

| 5,471,469 | A | * | 11/1995 | Flammer et al. | ............... 370/346 |
| 5,613,219 | A | * | 3/1997 | Vogel et al. | ..................... 455/78 |
| 5,793,757 | A | * | 8/1998 | Uddenfeldt | ..................... 370/335 |
| 6,831,904 | B1 | * | 12/2004 | Yamao et al. | .................. 370/331 |
| 7,760,694 | B2 | | 7/2010 | Cheung et al. | |
| 8,050,619 | B2 | * | 11/2011 | Horiuchi et al. | ................... 455/7 |
| 8,351,353 | B2 | * | 1/2013 | Xie et al. | ...................... 370/261 |
| 2008/0009280 | A1 | * | 1/2008 | Ushiki et al. | ................... 455/425 |
| 2012/0106502 | A1 | * | 5/2012 | Goldhamer | .................... 370/330 |

* cited by examiner

*Primary Examiner* — Robert Wilson
(74) *Attorney, Agent, or Firm* — Procopio, Cory, Hargreaves & Savitch LLP

(57) ABSTRACT

A method is provided for direct communications between members of at least one communication group of wireless entities, in which two communication groups are provided. A first group that has at least two wireless entities of an identical type, and a second group that has at least one wireless entity. A time slot is allocated in a frame belonging to a frame-based protocol for use by members of the first group to exchange direct communications between each other. The same time slot is used by at least one wireless entity of the second group to exchange non-direct communications in accordance with the frame-based protocol, or direct communication with one or more wireless entities of second group. Within the time slot, frequency resources within the same frequency channel are allocated to each of the two communication groups.

10 Claims, 5 Drawing Sheets

DIRECT COMMUNICATIONS IN WIRELESS NETWORKS

CROSS-REFERENCE TO RELATED APPLICATIONS

This application claims priority of Israel Patent Application No. 209009, filed Oct. 31, 2010, the disclosure of which is incorporated, by reference herein in its entirety.

TECHNOLOGICAL FIELD

The present invention relates to wireless communications and more particularly to direct communications between wireless network entities.

BACKGROUND

Wireless telecommunication network is a collection of entities which enable communications between users of the network. Typically, in common wireless telecommunication network, an end point entity known as mobile subscriber (MS) is connected wirelessly to a base station (BS) which in turn is connected through a backhaul connection to the operation and switching gateways. Regular operation of such a telecommunication network is characterized in that each entity, when communicating with another entity of the identical type and located at the same hierarchy, must have its communications exchanged via at least one entity of a higher hierarchy. For example, when a communication session is held between two MSs located close to each other, the communications are conveyed along a communication path that includes at least one BS, and when two BSs exchange data therebetween, the communication path that connects them will typically pass through at least one access gateway. In both above examples, the path that extends via the respective higher level entities is associated with delays due to the transport network, delays which might be too high for up-coming technologies, such as network MIMO, or for providing higher network resilience. Therefore, for cases where the communicating entities are located close enough to each other, there will be an advantage to have them communicating directly with each other.

Wireless telecommunication networks usually operate in a scheduled mode, and the scheduling information may be transmitted using messages. For example, in the IEEE 802.16 standard such messages are named DL-MAP and UL-MAP or may be referred to as transmission maps (MAP). The transmission MAP typically specifies the burst scheduling and the resources allocation. Prior art solutions such as the one described in U.S. Pat. No. 7,760,694, enable MSs to communicate directly with each other, by deviate from a transmission map to be broadcasted by the base station of the wireless network. However the prior art solutions art are not efficient enough with respect to managing the network resources and fail to provide a complete and satisfactory solution for today's growing needs for bandwidth, as they do not take the advantage in the granularity of the resource allocation both in time and in sub-carrier (OFDMA or FDMA) dimensions of the frequency channel.

SUMMARY OF THE DISCLOSURE

It is an object of the present invention to provide a spectral-efficient method for enabling direct communications between members of communication groups, where a communication group comprises at least two wireless entities operative in a wireless network.

It is another object of the present invention to provide a method for allocating time and frequency resources to wireless entities in a manner that enables the operation of the wireless network in accordance with a given, frame-based protocol while carrying out direct communications between wireless entities.

It is still another object of the present invention to establish a direct communication mode at the PHY resource level.

Other objects of the present invention will become apparent as the description of the invention proceeds.

Thus, according to a first embodiment there is provided in a wireless communication system comprising a plurality of wireless entities and operative by complying with a frame-based protocol, a method for enabling direct communications between at least two members of at least one communication group of wireless entities, the method comprising:

providing at least two communication groups, wherein a first communication group of the at least two communication groups comprises at least two wireless entities being of an identical type as any of the other members of that first communication, group and a second communication group of the at least two communication groups comprises at least one wireless entity;

for the at least two communication groups, allocating a time slot in at least one frame belonging to the frame based protocol for use by members of the first communication group to exchange direct communications between themselves and for use by the at least one member of the second communication group either to exchange non-direct communications in accordance with the frame-based protocol or to exchange direct communications with one or more other members belonging to that second communication group, wherein the one or more other members of the second communication group are of identical type as the at least one member of that second communication group; and within the time slot, allocating to each of the at least two communication groups a respective frequency resource within the same frequency channel.

A wireless entity according to the present invention is any entity operative in a wireless network. Such a wireless entity may be an access base station ("ABS"), an hub base station ("HBS"), mobile subscriber ("MS"), a fixed subscriber station ("SS"), a relay station and the like.

The term "direct communication" as used herein throughout the specification and claims, is used to denote exchanging communications between two wireless entities of the identical type, which are carried over the air without being carried via a backhaul system. The term "identical type" refers to two or more wireless entities wherein each of these wireless entities is operative in accordance with the same physical communication mode (i.e. PHY mode) as the other, and functions at the same hierarchy within the wireless network as the other. For example, a group of subscriber terminals, a group of base stations, a group of relays and the like.

A time slot according to the present invention is defined as a time interval being shorter (unless specified differently) than the duration of the frame of the frame-based protocol.

According to another embodiment, a sub-frame (e.g. a DL (up-link) sub-frame and a DL (downlink) sub-frame) may comprise at least one time slot for direct communications.

The frequency resource allocated each of the communication groups according to the present invention is for example a number of sub-channels (when operating in compliance with IEEE 802.16), or a number of resource blocks (when operating in compliance with LTE).

It should be understood that in accordance with the present invention, the communications exchanged during the allocated time slot are direct communications exchanged between members belonging to at least one group. The communications exchanged by members of the second group could be either direct communications exchanged between members of that second group or communications that are compatible with the frame-based protocol and are exchanged with radio entities belonging to different hierarchies.

In accordance with another embodiment, direct communications exchanged between base stations, may be held within the same slot as direct communications exchanged between MSs.

By yet another embodiment, the direct communications exchanged between base stations are held within a first time slot, and direct communications exchanged between MSs are held in a second time slot, being a different time slot from the first time slot. One option for allocating these time slots is to include the first time slot as part of a DL sub-frame, and the second time slot as part of a UL sub-frame. In the alternative, the first time slot may be part of a UL sub-frame, whereas the second time slot part of a DL sub-frame.

According to still another embodiment, the direct communication between members of at least one communication group of wireless entities is carried out via another wireless entity being of an identical type as the members of the respective at least one communication group of wireless entities, thereby having that other wireless entity operating as a relay.

In accordance with another embodiment of the invention, direct communications between two or more members of at least one of the communication groups are carried out while complying with a communication protocol which is different from the frame-based protocol being used by these two or more members for communicating with wireless entities of a different type.

According to yet another embodiment, during a time period which can be shorter, equal or longer than the frame duration of the frame-based protocol frame and assigned for carrying out direct communications, at least two wireless entities of a communication group hop to operate under another frequency.

By still another embodiment, the members of one of the at least two communication groups are capable of directly communicating with each other at the same time slot and while using the same frequency resource as members of another one of the at least two communication groups, where the members of the other groups may be operating either under direct communication mode or under regular operating mode in accordance with the frame-based protocol.

According to another aspect of the invention, there is provided a wireless entity, the wireless entity is adapted to enable direct communications between members of at least one communication group, wherein each member of a respective communication group is of an identical type as any other member of that communication group of wireless entities, and wherein said wireless entity comprises:

a processor adapted to allocate a time slot in at least one frame belonging to the frame based protocol, for use to exchange direct communications between members of said at least one communication group of wireless entities, and for use by at least one member of a second communication group either to exchange non-direct communication in accordance with the frame-based protocol or to exchange direct communications with one or more other members belonging to the second communication group wherein the one or more other members are of an identical type as the at least one member of that second communication group and to allocate within said time slot to each of the at least two communication groups, a respective frequency resource within the same frequency channel;

a transmitter adapted to transmit information regarding the time slot and frequency resources allocated for exchanging direct communications by members of the at least one communication group of wireless entities.

According to another embodiment of this aspect of the invention, the wireless entity is further adapted to communicate directly with adjacent enough wireless entity of an identical type as said wireless entity, and further comprising a receiver adapted to receive information concerning allocations of one or more time slots and one or more frequency resources for communicating with the adjacent wireless entity.

One possible implementation of this embodiment is an ABS which is able to communicate directly with another ABS. Another possible implementation of this embodiment is an HBS which is able to communicate directly with another HBS.

According to another embodiment of the invention, the wireless entity is further adapted to use a communication protocol which is different from the frame-based protocol being used by these two or more members for communicating with wireless entities of a different type.

According to yet another embodiment, at least two of the communication groups are characterized in that the interference level in transmission/reception experienced by all members of each of the at least two communication groups is below a pre-determined threshold.

By still another embodiment, the processor is further adapted to enable exchanging direct communications between wireless entities of a first type within a first time slot and to enable exchanging direct communications between wireless entities of a second type in a second time slot, being a different time slot from the first time slot.

According to another aspect of the invention there is provided a wireless communication system comprising a plurality of wireless subscriber terminals and at least one base station, and operative by complying with a frame-based protocol, wherein the wireless system is adapted to enable direct communications between members of at least one communication group, wherein members of each of the at least one communication group are all wireless entities of an identical type to each other, the system comprising:

at least one processor adapted to allocate a time slot in at least one frame belonging to the frame based protocol, for use to exchange direct communications between members of the at least one communication group of wireless entities, and for use by at least one member of a second communication group either to exchange non-direct communication in accordance with the frame-based protocol or to exchange direct communications with one or more other members belonging to the second communication group wherein the one or more other members are of an identical type as the at least one member of that second communication group and to allocate within the time slot to each of the at least, two communication groups, a respective frequency resource within the same frequency channel;

at least one transmitter adapted to transmit information regarding the time slot and frequency resources allocated for exchanging direct communications by members the at least one communication group of wireless entities.

In accordance with another embodiment of this aspect of the invention, the system provided comprises a plurality of base stations, each comprising a receiver adapted to receive information regarding a time slot and one or more frequency resources that have been allocated to a base station with which that receiver is associated, for directly communicating with at least one other base station.

According to another embodiment of the present invention, in case where there are two or more different types of wireless entities that are adapted to communicate in a BS-to-BS type of direct communication (e.g. ABSs or HBSs), the time slots allocated for carrying out direct communications between wireless entities of an identical type, are synchronized across the wireless network.

DETAILED DESCRIPTION OF PREFERRED EMBODIMENTS

A better understanding of the present invention may be achieved when reading the following description in conjunction with the figures.

Figure 1:
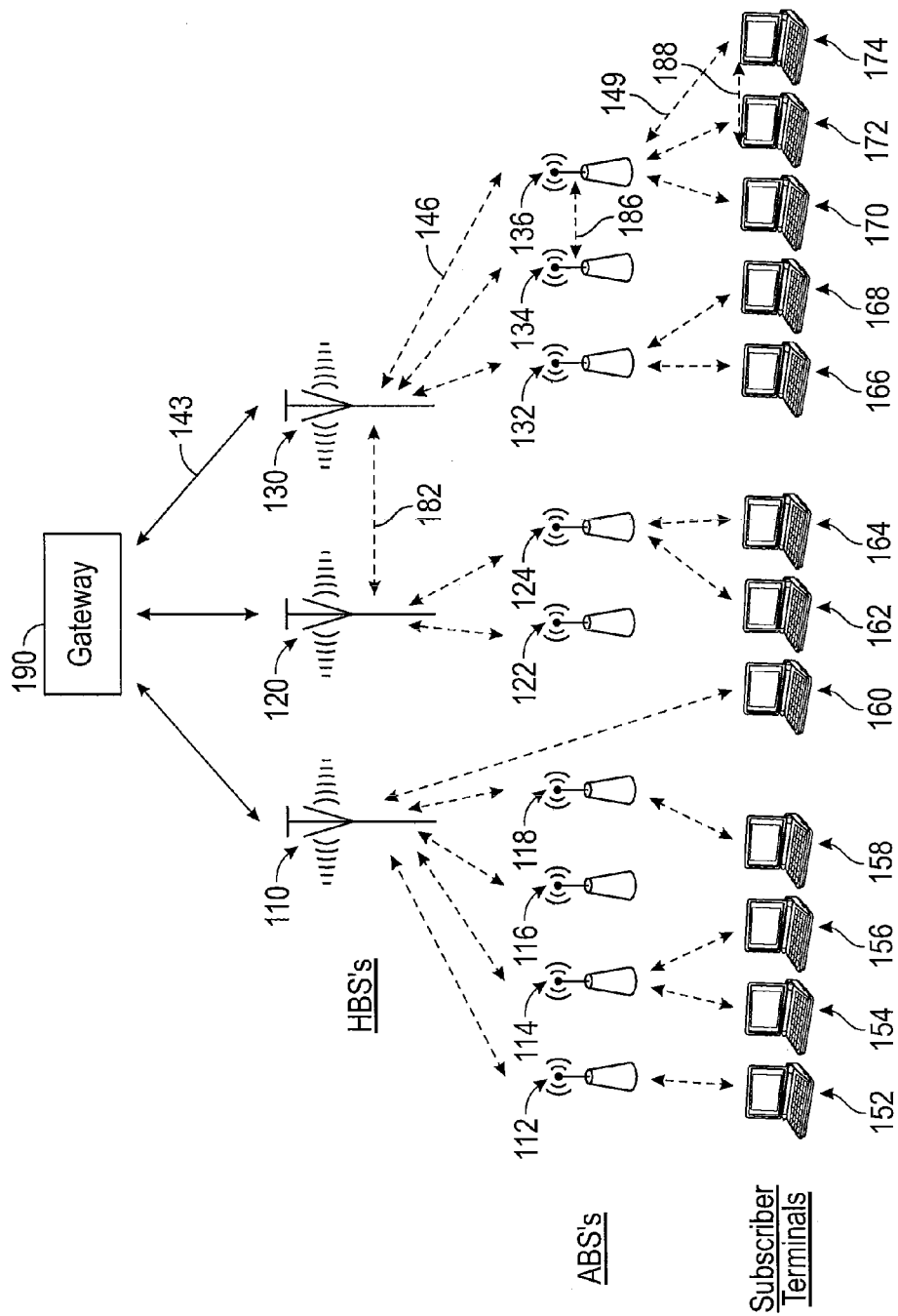
FIG. 1 illustrates a network configuration for carrying out the method provided by the present invention.

FIG. 1 exemplifies a network configuration adapted to carry out the method provided by an embodiment of the present invention. The network configuration comprises a double Base Station hierarchy or a Base-Station-Relay hierarchy. The network comprises a plurality of subscriber terminals (152-174) which are served by a plurality of ABSs (112, 114, 116, 118, 122, 132, 134 and 136), which in turn are served by a plurality of HBSs (110, 120 and 130). The ABS (Access Base Station) may operate either as a stand-alone BS or as a Relay. The HBS is a Hub Base Station which provides full or partial ABS backhauling capabilities.

The term "direct communication" as used herein relates to communications exchanged over the air between two network entities of a similar type, e.g. BS to one or more BSs (where the term "BS" may also refer to ABS and HBS), relay to relay or MS to one or more MSs (where the term "MS" may refer to both MS and/or SS). The scope of the direct communication may be for example:
  Network MIMO operation;
  Support of interference mitigation; and
  Increased, resilience of the system.

In the examples discussed in the following detailed description, two types of Direct Communication Operation (DCO) between wireless network entities are demonstrated:
  DCO between Base Stations (BSs); and
  DCO between Mobile Subscribers (referred to as MSs or SSs).

Preferably, the DCO is carried out within the licensed spectrum, but may also be carried out within un-licensed spectrum.

The communication between one radio entity and one or more other radio entities of the same type will be referred to hereinafter as a "direct communication group". Within a direct communication group, a radio entity may transmit communications directly to one or more entities of the same type and/or may receive communications directly from one or more entities of the same type.

Examples demonstrating the method provided by an embodiment of the present invention for direct communication mode at the PHY resource level of frame structures and resource block partition resources are presented further below.

Time-Domain Frame Structures
DCO in the ABS and HBS Radio Frame

Although, the present invention may be implemented in every frame based radio system architecture (e.g. WiMAX and LTE), still, the following embodiments describe how the invention may be implemented in radio system architecture designed for dense urban areas. In these examples, the system integrates a plurality of Access Base Stations (ABSs) that create a denser base station grid below the rooftops, e.g. ABSs may be deployed on electricity poles, traffic lights etc. The ABSs connection to the network (the backhaul connection) is done via another type of base stations called Hub Base Station (HBS). The HBS is preferably a powerful base station, which may be mounted over or below the roofs and adapted to serve ABSs and MSs which are located in its proximity.

FIG. 1 illustrates such a system architecture, with HBSs 110, 120 and 130 having a broadband backhaul connection (143), with a Gateway (GM) 190 and where each HBS is operative to wirelessly communicate (146) with a plurality of ABSs (e.g. HBS 110 is operative to communicate with ABSs 112, 114, 116 and 118). MSs may receive service (149) from either the ABS or the HBS. As shown in FIG. 1, normally, MS 152 communicates with ABS 112, MSs 154 and 156 communicate with ABS 114, MS 158 communicates with ABS 118 and MS 160 communicate directly (i.e. not via an ABS) with HBS 110. As mentioned before, possible usage of this new architecture is in urban areas, such as cities where the HBSs may be deployed in large junction while the ABSs may be located in intersections or along the streets. While deploying such an architecture two types of direct communication ("DCO") between Base Stations may be used, namely ADC (i.e. ABS Direct Communication, when two or more ABSs directly communicate with each other, e.g. 186) and HDC (i.e. HBS Direct Communication, when two or more HBSs directly communicate with each other, e.g. 182). Thus, when this architecture is deployed, there are three different possible modes of direct communication, namely, HBS-HBS (182), ABS-ABS (186), and MS-MS (188).

The time-slots in which direct communications may be scheduled can be arranged in a variety of modes. In the proceeding description a number of non-exclusive examples are provided.

Figure 2:
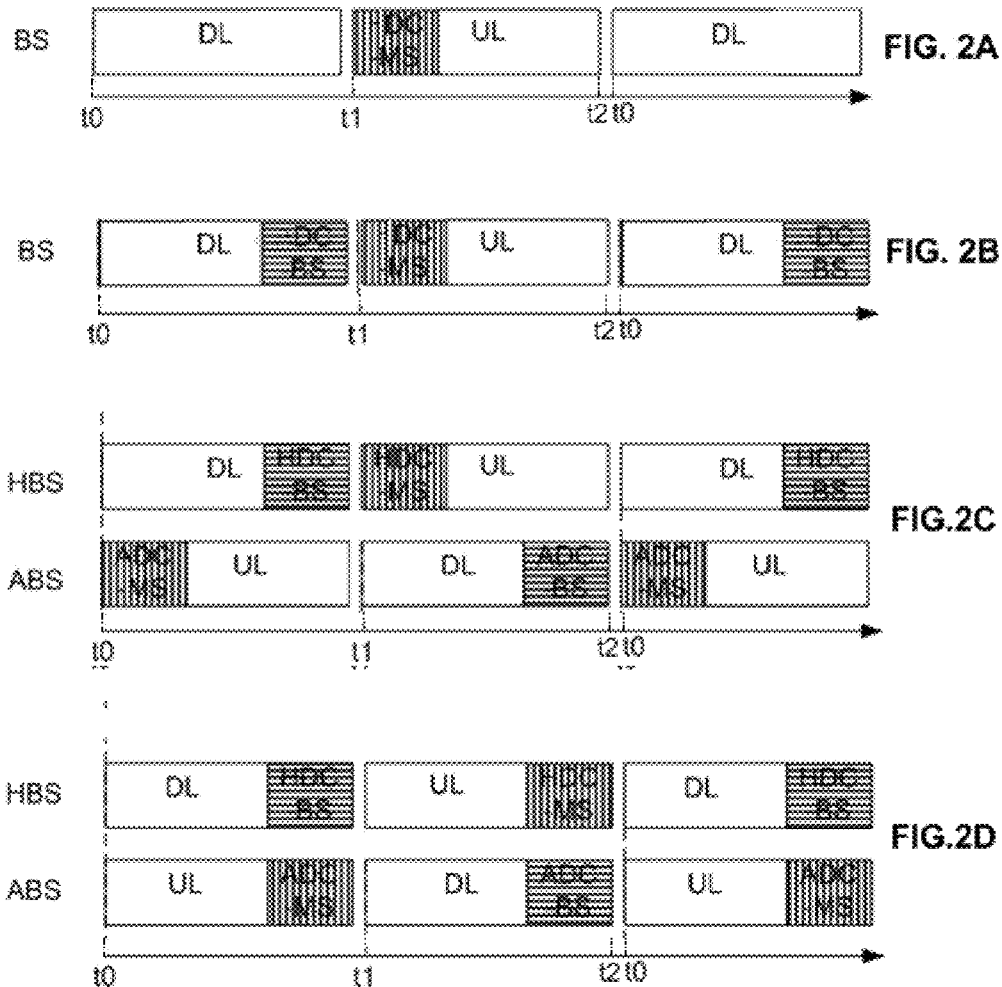
FIG. 2A to 2D demonstrate examples of frames' structures in accordance with embodiments of the present invention.

FIG. 2A to 2D demonstrate examples of modified frame structures of TDD frames of the communication protocol in compliance with which the system is operative. As will be appreciated those skilled in the art, although the present examples demonstrate the use of TDD frames, same may be applicable mutatis mutandis to FDD frames. FIG. 2A demonstrates a simple case where there is a time slot only for direct communications between MS-MS. FIG. 2B demonstrates another case where both MS-MS direct communications and BS-BS direct communications take place within one frame. FIG. 2C and FIG. 2D are examples of possibilities to allocate time slots in cases where there are two types of BSs (HBS and ABS). Let us further consider FIG. 2C in order to better understand the present invention. A frame is defined to extend from $t_0$ to $t_2$, where $t_0$ indicates of the beginning of a new frame. Each frame is divided into two main sub-frames, an UpLink (UL) sub-frame, and a DownLink (DL) sub-frame. In FIGS. 2C and 2D we see that the HBS and the ABS are synchronized with each other, so that when the HBS is in a mode of transmission, the ABS is in a mode of reception and vice versa. For both the HBS and ABS, each sub-frame (UL and DL) comprise a time slot dedicated for direct communication, i.e. HDC-BS is a time slot of an HBS frame allocated for HBS to communicate directly with another HBS, HDC-MS is a time slot of an HBS frame allocated for MSs (receiving service from that HBS) to communicate with other MSs, ADC-BS is a time slot of an ABS frame allocated for ABS to communicate directly with another ABS, and ADC-MS is a time slot of an ABS frame dedicated for MSs (receiving service from that ABS) to communicate with respective MSs. In accordance with an embodiment of the present invention, part of the DL sub-frame is allocated for the BS-BS direct communications while the part of the UL sub-frame is allocated for MS-MS direct communications, such as to avoid adding interference between ABS and HBS cells. However such allocation is not a essential and a scenario when the BS-BS communication are part of the UL sub-frame while the MS-MS communication are part of the DL sub-frame, should be understood to be encompassed within scope of the present invention. According to another embodiment, the BS DCO may be placed at the end of the DL sub-frame, while the MS DCO can be placed either at the beginning of the UL sub-frame as demonstrated in FIG. 2C or an the end of the UL sub-frame as demonstrated in FIG. 2D. The HBS DL and UI, sub-frames may be shorter if required to separate the interference created to an MS in the ABS cell.

According to another embodiment, in order to eliminate or reduce the likelihood of interference caused by transmitting entity to communications received by a receiving entity located at the proximity of the transmitting entity, the DCO zones within HBS and ABS time-domain partitions may be synchronized across the wireless network.

According to another embodiment illustrated in FIG. 2D, P-MP (point-to-multipoint) and Mesh operations are separated in time domain, while same time partition may be used in both ABS and HBS cells. Let us consider an example where the radio entity illustrated in FIG. 1 is a base station that ceases no operate. In such a case an MS/SS previously connected to that base station may try to directly communicate with another radio entity of an identical type as that MS/SS, and the latter may be directly or indirectly connected to another base station. This base station (or any other applicable network element) may schedule the time slot and the frequency resource for carrying out the direct communications between the above described MS/SS with the other radio entity which will then function for that first MS/SS, as a "relay".

Assignment of Frequency and Time Resources

Some basic principles which may be used for the assignment of resources for DCO are listed below. These principles are general, and are independent of the system's architecture.

1. The DCO uses resource allocation, wherein the resource may be defined as being a combination of time resource and frequency resource within a frequency channel.

2. Direct communications within the BS cell should not affect the start of DL frame and the transmission of the preambles and control channels for example for systems which comply with IEEE 802.16 Standard and the control channel, reference signals and synchronization signals for example for systems which comply with LTE Standard.

3. Direct communications between two or more members of at least one of said communication groups may be carried out in compliance with a communication protocol, which is different from the protocol being used by the two or more members while communicating with wireless entities using the frame based protocol. The protocol used for carrying out the direct communications may be a derivation of the cellular protocol being used or may be a different protocol all together. For example, an LTE system (comprising BSs, MSs, relays, etc.) may implement Wi-Fi or IEEE 802.16n Standards when carrying out DCO.

4. During a period assigned for carrying out direct communications, a wireless entity (e.g. a base station or an MS) may hop to another frequency for the duration of the direct communications period. Also, when operating at that frequency, the wireless entity may apply the same or a different air protocol as compared with the protocol used prior to that hop.

5. An MS/SS may transmit communications to another MS within a radio frame while respecting the restrictions above. In FDD type of systems, the MS transmission may be carried out on either DL or UL frequencies.

6. A BS may transmit no another BS either during the DL or UL sub-frames (in TDD system) or while using either DL or UL frequencies (in FDD systems).

7. The Direct communication mode may utilize a pre-scheduled time and/or frequency resource, either dedicated only to such direct communications or the frequency channel may be used for both DCO and regular communications.

8. If the time resource is dedicated for DCO only (Mode 1), the resource may be used by multiple communication groups, the sharing being done in the frequency domain, time domain or a combination thereof.

A time resource can be one or more:
TTI intervals in HSDPA
DL or UL slots or sub-frames in IEEE 802.16; sub-frames or slots in LTE.

A frequency resource may be composed of:
a number of sub-channels (when complying with the 802.16 Standard)
a number of resource blocks (when complying with the LTE standard).

A communication group may include two or more BS entities or two or more MS/SS entities.

9. If the time and frequency resources are used for both DCO and regular operation (Mode 2), the system may allocate a number of resources for DCO only and other resources can be either used for regular cellular operation only or may be used for a combination of DCO and regular cellular operation.

10. If a BS is transmitting during the UL, it should operate as an MS. If an MS is transmitting during the DL, it should use the allocated frequency resource as if it were a BS.

11. An entity can use, when transmitting, a PRY mode which is different from the PRY mode used by its respective pair entity for regular cellular reception.

12. In the DCO-dedicated mode (Mode 1), time slot and/or the time-frequency resources allocation is carried out in accordance with the following:

Communication groups that their transmissions do not interfere with each other (at the receiver location of each group) or which may mitigate the interference, may use the same time or frequency resource, preferably at power densities lower than the maximum power density. This time and/or time-frequency resource is referred to herein as SDC— "Shared Direct Communication". The SDC is an important element for increasing the spectral efficiency and can be implemented using the MIMO technology for SDMA.

Figure 3:
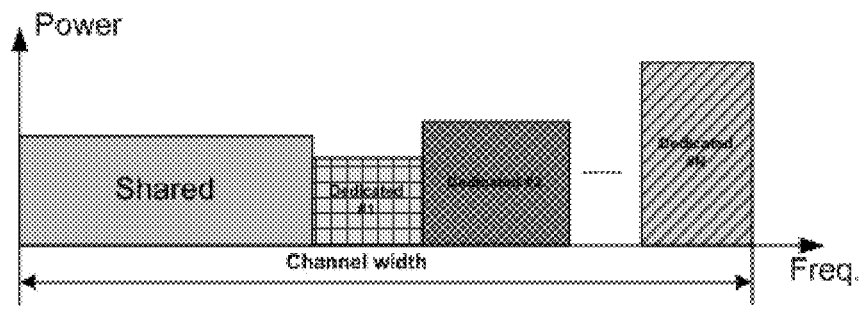
FIG. 3 demonstrates an example of assigning available resources in a given time interval.

As for time and/or time+frequency resources that remain after utilizing the required resources allocated for SDC type of operation, they may be divided into a number of dedicated partitions, each may be used by one or more DCO groups. The dedicated partitions can span in time, frequency or a combination thereof. A communication group may use a different partition for each transmission, depending on the SINR experienced at the receiver's location. An example of such a division of resources for the transmitter for a given time interval, is shown in FIG. 3, however, it should be noted that a different frequency resources' division may be associated for other time intervals for that very same transmitter.

13. During the combined DCO and regular operation (Mode 2), a time-frequency resource may be shared between the normal access (MS communication with BS, Relay, etc.) and DCO in a number of modes, as described further below.

In practice, when using the Partially Used Sub-Carrier ("PUSC") permutation as provided in IEEE 802.16, some receivers may not be able to use the allocation method provided in the above examples due to compatibility problems between the transmitter resource usage and the receiver resource usage. The reason is that in PUSC, the down-link and up-link sub-channels use a non-compatible sub-carrier permutation such that when using DCO, it might be problematic to use the entire channel in this mode. However other schemes of resource allocation, such as adjacent carrier permutation in IEEE 802.16 or LTE, will allow carrying out this communication mode as provided by the present invention.

Possible resource allocation schemes are:

Mode 2.1—Common time and/or frequency resources, without any demarcation, are allocated for:

Regular operation; and

DCO.

The transmitter uses the resource as in regular type of operation and only the receiver is aware that the transmission will arrive from an entity implementing DCO.

Figure 4:
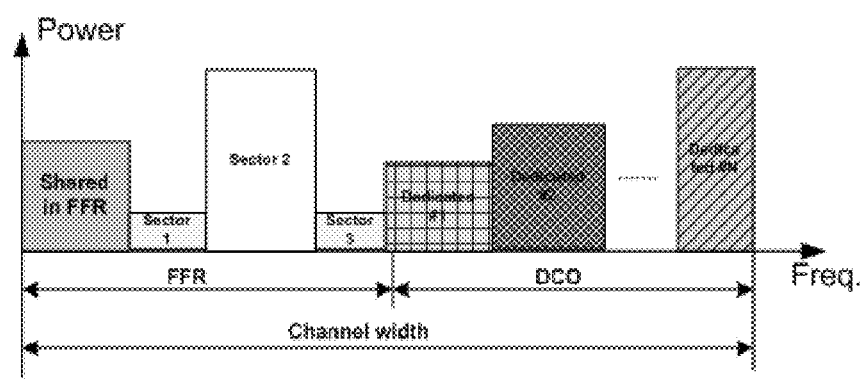
FIG. 4 illustrates an example of assigning available resources in a given time interval between normal operation (e.g. according to the Standard used within the system) and direct communications.

Mode 2.2—Different time and/or frequency resources are allocated for:

Regular operation; the time and/or frequency resources can be used according to FFR ("Fractional Frequency Reuse") rules or other interference mitigation rules;

DCO; the time and/or frequency resources can be used according to rules described in the above point 12;

Division between resources allocated for regular operation and DCO may be dynamically changed. FIG. 4 illustrates an example of the frequency resource division between normal operation (using FFR) and DCO, using only dedicated resources.

Mode 2.3—The time and/or frequency resources are divided into dedicated and shared resources.

The dedicated resources may be further divided per BS sector. Each transceiver may use a dedicated partition of these resources at its maximum transmitting power density, for either regular operation or DCO, or each transceiver may enjoy minimum interference during reception. In case of BS-BS direct communications, the dedicated partition selection rule may favour selecting a partition based on the interference level at the receiver, and in fact different partitions may be used for each of the DCO direction.

Figure 5:
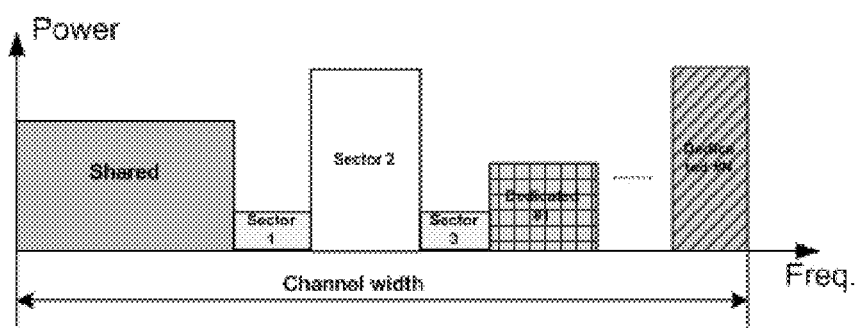
FIG. 5 illustrates an example of assigning available resources in a given time interval, wherein, some of the resources are shared resources while others are dedicated resources, and wherein the shared resources may be used for both normal operation and direct communication.

The shared resources may be used for both regular operation and DCO. An example of resource allocation is illustrated in FIG. 5.

EXAMPLES OF DIRECT COMMUNICATION SCENARIOS

Example 1

Two ABSs Transmit Simultaneously to Another ABS

Figure 6A:
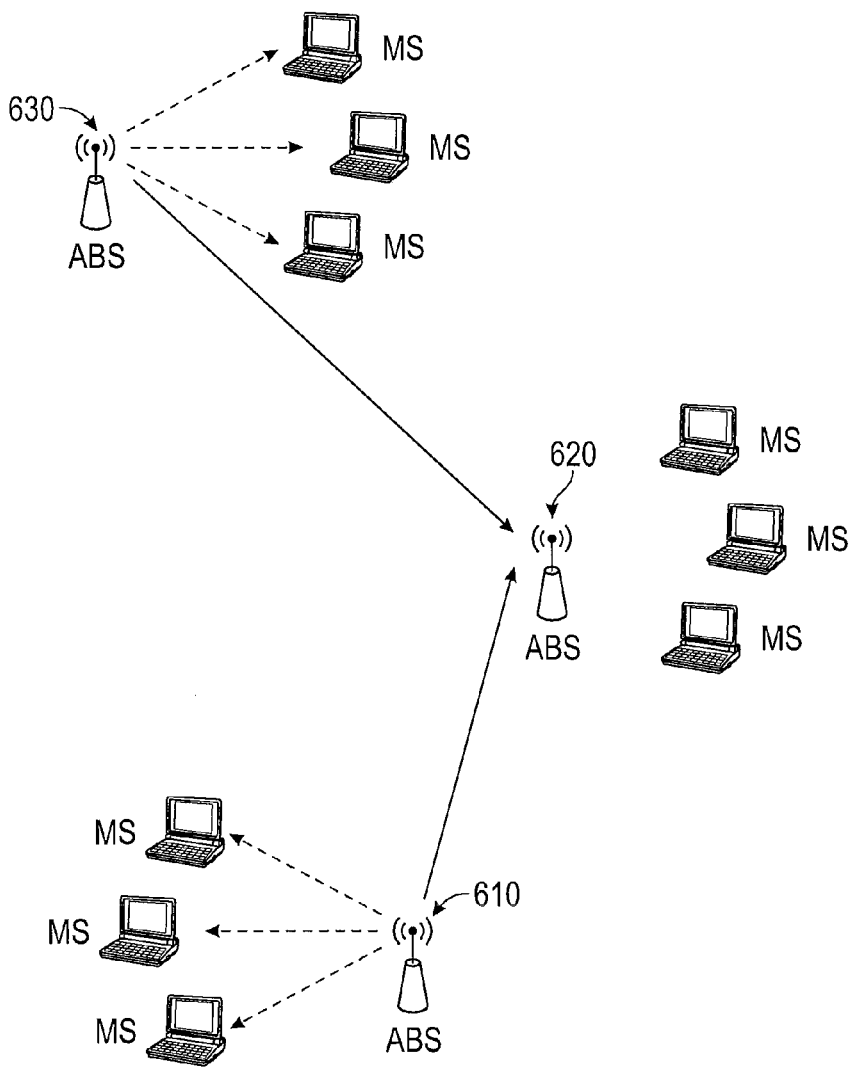
FIG. 6A demonstrates an example of two ABSs that communicate simultaneously and directly with a third ABS.

Let us assume that ABS 610 and ABS 630 as illustrated in FIG. 6A use some OFDMA sub-channels for communicating at the same time with ABS 620. At the same time, but on different OFDMA sub-channels, ABS 610 and ABS 630 may transmit in that time slot also regular DL traffic, so they operate in accordance with Mode 2 discussed above.

In this example, ABS 620 has to extend its DL operation for the duration of the DCO held between ABS 610 and ABS 630, while using only part of its frequency channel capacity for DCO. The rest of the channel capacity may be used only if the frequency resource allocation is similar in both the DL and UL, as in the LTE Standard. For using minimum resources during the DCO, the duration of the DCO should preferably be minimized.

Figure 6B:
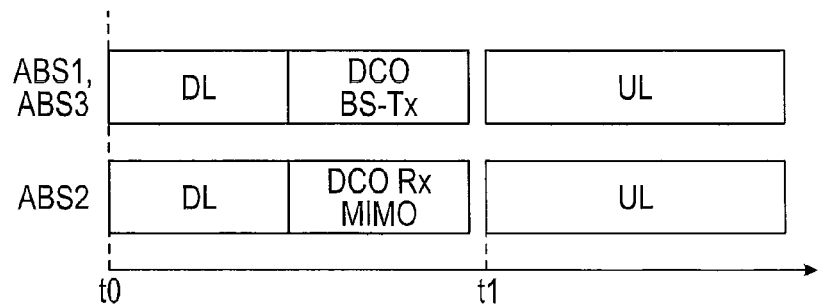
FIG. 6B demonstrates an example of a frame adapted to convey communications for the example shown in FIG. 6A.

Now let us assume that ABS 620 is using MIMO on its receiver and can separate the traffic from ABS 610 and ABS 630 by using Multiple Input, Multiple Output ("MIMO") technology. In this case, ABS 610 and ABS 630 may transmit using the same frequency resource, while ABS 620 will receive their transmissions while using for example Mode 1 (as described above), having a single shared partition. The example discussed above of combined DCO and MIMO operation is demonstrated in FIG. 6B. In the initial DL part of the frame, ABS 610, ABS 620 and ABS 630 communicate with their associated MSs. During the DCO interval, ABS 610 and ABS 630 send information to ABS 620, using the same time-frequency resource. The information belonging no ABS 610 and ABS 630 is separated using the network MIMO or multi-user MIMO technologies.

Example 2

Relaying MS Data

MS-MS direct communication is recommended within the same BS cell in case of high MSs' density. This way, an MS transmitting during the UL may receive DCO data from another MS and relay the received data to its serving BS.

Example 3

Two MS Pairs Using DCO

Figure 7:
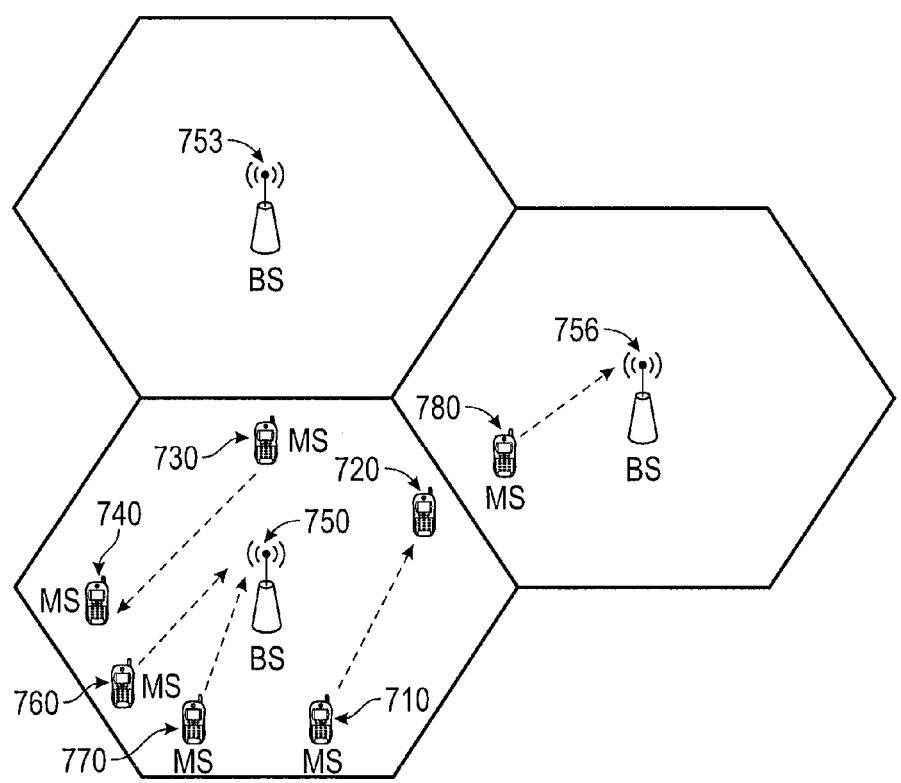
FIG. 7 illustrates an example of two that transmit information, simultaneously.

Let us now consider the scenario illustrated in FIG. 7, where two MSs transmit information at the same time: MS 710 transmits directly to MS 720 and MS 730 transmits directly to MS 740. Under normal operating conditions, the above mentioned MSs are served by BS 750 (for example ABS, HBS, and the like). The transmission is done during the up-link sub-frame, such that MS 710 (transmitting) and MS 720 use some frequency resources, MS 730 (transmitting) and MS 740 use another frequency resources, while the other MSs (760 and 770) may transmit to BS 750 while operating under their regular operating mode.

In this example BS 750 operates in FFR mode, and in case that the reception by MS 720 is interfered by transmissions of another MS (e.g. 780) associated with another BS (e.g. BS 756), the dedicated up-link partition of BS 750 may be used for transmissions sent by MS 710, and since MS 740 is not interfered by any BS, MS 730 may transmit according to Mode 2.3 using the "shared" allocations. The other MSs may use dedicated or shared partitions, according to one of the modes described above under DCO Mode 2.

As will be appreciated by those skilled in the art, the terminology used throughout the specification and claims is primarily associated with the IEEE 802.16 Standard. However, it should be understood that the present invention encompasses other frame-based standards such as OFDM, LTE, HSDPA and the like as well as both TDD and FDD duplexing modes. Also, the examples provided show certain ways of carrying out the invention. However, similar processes may be applied in a similar way in order to accommodate different network's configurations which comprise various wireless entities, all without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The research leading to the above results has received funding from the European Community's Seventh Framework Programme (FP7/2007-2013) under grant agreement no 248267-BuNGee".

The invention claimed is:

1. A method for use in a wireless communication system, the method comprising:
   exchanging direct communications between a first mobile subscriber and a second mobile subscriber during a first time slot in a frame of a frame based protocol, wherein the exchange of direct communications is carried out over at least a first sub-carrier in a frequency channel and the first subscriber and the second subscriber belong to a first communication group; and
   a first base station exchanging non-direct communications or exchanging direct communications with a second base station during the first time slot, wherein the exchange of non-direct communications or direct communications is carried out over at least a second sub-carrier in the frequency channel and the first base station and the second base station belong to a second communication group.

2. The method according to claim 1, further comprising members of each of the at least two communication groups exchanging direct communications with other one or more members of their respective communication group.

3. The method according to claim 1, further comprising exchanging direct communications between base stations within the a different slot as direct communications exchanged between mobile subscribers.

4. The method according to claim 1, further comprising exchanging communication between members of at least one communication group via another wireless entity being of an identical type as the members of the respective at least one communication group of wireless entities, thereby having said other wireless entity function as a relay.

5. The method according to claim 1, further comprising carrying out the direct communications between two or more members of at least one of said communication groups in compliance with a communication protocol which is different from the frame-based protocol being used by said two or more members while communicating with wireless entities of a different type.

6. The method according to claim 1, further comprising at least two mobile subscribers hopping to another frequency to exchange direct communications during a second time slot assigned for carrying out direct communications.

7. The method according to claim 1, further comprising the members of the first communication group directly communicating with each other at the same time slot and while using the same frequency resource as members of the second communication group.

8. A wireless entity comprising:
   a processor configured to
      allocate a time slot in at least one frame belonging to a frame based protocol, for use to exchange direct communications between members of at least one communication group of wireless entities, and for use by at least one member of a second communication group either to exchange non-direct communication in accordance with said frame-based protocol or to exchange direct communications with one or more other members belonging to said second communication group wherein said one or more other members are of an identical type as said at least one member of that second communication group and
      allocate within said time slot to each of said at least two communication groups, a respective frequency resource within the same frequency channel such that an interference level in transmission/reception experienced by all members of each of the at least two communication groups is below a pre-determined threshold; and
   a transmitter which transmits information regarding said time slot and frequency resources allocated for exchanging direct communications by members of the at least one communication group of wireless entities.

9. The wireless entity according to claim 8, wherein the processor further communicates directly with an adjacent wireless entity of an identical type as said wireless entity, and further comprising a receiver which receives information concerning allocations of one or more time slots and one or more frequency resources for communicating with said adjacent wireless entity.

10. A wireless entity comprising:
    a processor adapted to
       allocate a time slot in at least one frame, for use to exchange direct communications between members of a first communication group of wireless entities, and for use by at least one member of a second communication group of wireless entities either to exchange non-direct communication in accordance with a frame-based protocol or to exchange direct communications with other members belonging to said second communication group, wherein said other members are of an identical type as said at least one member of that second communication group, and
       allocate within said time slot to each of said first and second communication groups, a respective frequency resource within the same frequency channel; and
    a transmitter which transmits information regarding said time slot and the frequency resources allocated for exchanging direct communications by members of the at least one communication group of wireless entities;

wherein said processor is further configured to allocate at least one sub-carrier in the frequency channel for exchanging direct communications between wireless entities of a first type and to allocate at least a second sub-carrier in the frequency channel in a second time slot, different from the first time slot, for exchanging direct communications between wireless entities of a second type.

* * * * *